(12) United States Patent
Sato

(10) Patent No.: US 6,680,437 B2
(45) Date of Patent: Jan. 20, 2004

(54) GROMMET

(75) Inventor: Masayuki Sato, Kosai (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/197,503

(22) Filed: Jul. 18, 2002

(65) Prior Publication Data

US 2003/0015338 A1 Jan. 23, 2003

(30) Foreign Application Priority Data

Jul. 18, 2001 (JP) ...................... P2001-217996

(51) Int. Cl.[7] ................................. H02G 3/18
(52) U.S. Cl. .................. 174/65 G; 174/153 G; 16/2.1; 248/56
(58) Field of Search .............. 174/65 G, 152 G, 174/153 G, 152 R, 65 R, 153 R, 135; 16/2.1, 2.2; 248/56; 439/567, 462

(56) References Cited

U.S. PATENT DOCUMENTS

| 4,912,287 A | * | 3/1990 | Ono et al. ............... 174/153 G |
| 5,257,763 A | * | 11/1993 | Nakamura .................. 248/56 |
| 5,981,877 A | * | 11/1999 | Sakata et al. ........... 174/153 G |
| 6,267,385 B1 | * | 7/2001 | Okamoto et al. ........... 277/627 |
| 6,297,457 B1 | * | 10/2001 | Yamada et al. ......... 174/152 G |
| 6,465,740 B2 | * | 10/2002 | Kondoh et al. ........... 174/65 G |

FOREIGN PATENT DOCUMENTS

JP      10-92243      4/1998

* cited by examiner

*Primary Examiner*—Dhiru R Patel
(74) *Attorney, Agent, or Firm*—Oblon, Spivak, McClelland, Maier & Neustadt, P.C.

(57) ABSTRACT

A grommet (10) has a small diameter drum portion (11), a large diameter drum portion (15) and a lip portion (19). A fitting groove (15*d*) which is fitted into a through hole of a panel is provided on an outer wall surface (15*a*). The lip portion (19) protrudes to an outer side of the outer wall surface (15*a*) of the large diameter drum portion (15) so as to contact closely with the panel (9). In the grommet (10), a rear surface side of the large diameter drum portion (15) is thin. Due to a thin-wall portion (15*c*) which is formed by thinning the rear surface side of the large diameter drum portion (15), upon opening a molding die (30), the lip portion (19) with a large undercut amount elastically deforms to a side of the thin-wall portion (15*c*). As a result, the grommet (10) can be easily released.

14 Claims, 6 Drawing Sheets

GROMMET

BACKGROUND OF THE INVENTION

1. Field of the Invention

The present invention relates to a grommet, which is fitted into a through hole of a panel of a vehicle or the like, and a wire harness is inserted therethrough.

2. Description of Related Art

FIG. 1 shows such a grommet. A grommet 1 has a thin small diameter drum portion 2, a thin tapered portion 3 and a thick large diameter drum portion 4 through which a wire harness 7 is inserted. The grommet 1 is formed by an elastic material such as rubber as a unit. A fitting groove 4b which is fitted into a through hole 9a of a panel 9 for vehicle is formed on an outer wall surface 4a of the large diameter drum portion 4.

An inner drum portion 5 which is connected with the small diameter drum portion 2 is formed to the inside of the tapered portion 3 so as to protrude from the tapered portion 3. A lip portion 6 is formed on the outer wall surface 4a of the large diameter drum portion 4 so as to closely contact with the panel 9 and protrude from the outer wall surface 4a to the outside. The art of the grommet 1 is disclosed in Japanese Patent Application Laid-Open No. 10-92243 (1998).

The conventional grommet 1 is formed by using a molding die 8 shown in FIG. 2. The molding die 8 is composed of an upper die 8A, a middle plate 8B, a lower die 8C and a core 8D. After the grommet 1 is molded by using the molding die 8, it is necessary to firstly pull out the upper die 8A and the middle plate 8B in a direction of an arrow A in FIG. 2 in order to take out the grommet from the molding die 8. However, in order to ensure the release the lip portion 6 with large undercut amount from the middle plate 8B, the middle plate 8B should be moved in the direction of the arrow A in FIG. 2, but a thick portion 4C of the large diameter drum portion 4 disturbs the mold release. Therefore, in order to release the middle plate 8B from the large diameter drum portion 4, the middle plate 8B is forcibly pulled out of the large diameter drum portion 4.

However, even if the grommet 1 is formed by rubber or the like, since the large diameter drum portion 4 has the thick portion 4C, and the forcible release utilizing the elastic material is restricted. This influences the molding cycle, and causes a deterioration in productivity.

SUMMARY OF THE INVENTION

The present invention has been accomplished to solve the above problem and it is an object of the present invention to provide a grommet, which is capable of improving productivity.

The first aspect of the present invention provides a grommet including a small diameter drum portion through which a wire harness is inserted, and a large diameter drum portion provided adjacently to the small diameter drum portion and through which the wire harness is inserted, and a fitting groove provided on an outer wall surface of the large diameter drum portion and fitted into a through hole of a panel, the improvement comprising: a lip portion which is provided on an outer side from the outer wall surface of the large diameter drum portion and contacts with the panel; and a thin-wall portion formed on a rear surface side of the large diameter drum portion.

According to the first aspect of the present invention, a rear surface side of the large diameter drum portion is thinned. Therefore, when the grommet is molded by a molding die, the grommet elastically deforms to the rear surface side of the large diameter drum portion easily, and released is assured. The lip portion with a large undercut amount is formed thin on the large diameter drum portion. As a result, the release characteristics at the time of molding the grommet are improved greatly, and the productivity of the grommet is improved.

The second aspect of the present invention provides a grommet according to the first aspect of the present invention, further comprising; a soundproof film for forming an air layer on the inside of the large diameter drum portion, wherein the thin-wall portion is provided between the lip portion and the soundproof film.

According to the second aspect of the present invention, the thin-wall portion is provided between the lip portion and the soundproof film. Therefore, the easy elastic deformation of the lip portion to the thin-wall portion for release is assured.

The third aspect of the present invention provides a grommet according to the second aspect of the present invention, wherein the soundproof film extends from an inner end of the thin-wall portion to a position where it contacts with the wire harness.

According to the third aspect of the present invention, the soundproof film extends from the inner end of the thin-wall portion of the large diameter drum portion to a position where it comes closely into contact with the wire harness. The soundproof film forms an air layer in the large diameter drum portion. Therefore, when the lip portion elastically deforms at the time of release, the lip portion does not interfere with the soundproof film. Therefore, the grommet with excellent soundproof characteristics is released from the molding die easily and securely.

The fourth aspect of the present invention provides a grommet according to the third aspect of the present invention, wherein the lip portion is formed into an approximate V-shape, and the thin-wall portion is provided between an outer wall of the lip portion and the soundproof film.

The fifth aspect of the present invention provides a grommet according to the first aspect of the present invention, wherein the small diameter drum portion is formed thin and the large diameter drum portion is formed thick.

The sixth aspect of the present invention provides a grommet according to the first aspect of the present invention, wherein the grommet is formed by an elastic material so that the small diameter drum portion, the large diameter drum portion, the fitting groove and the lip portion are integral.

BRIEF DESCRIPTION OF THE DRAWINGS

The invention will be described with reference to the accompanying drawings wherein.

DESCRIPTION OF THE PREFERRED EMBODIMENT

To describe the present invention in more detail, preferred embodiments of the present invention will be explained with reference to the drawings below.

Figure 1:
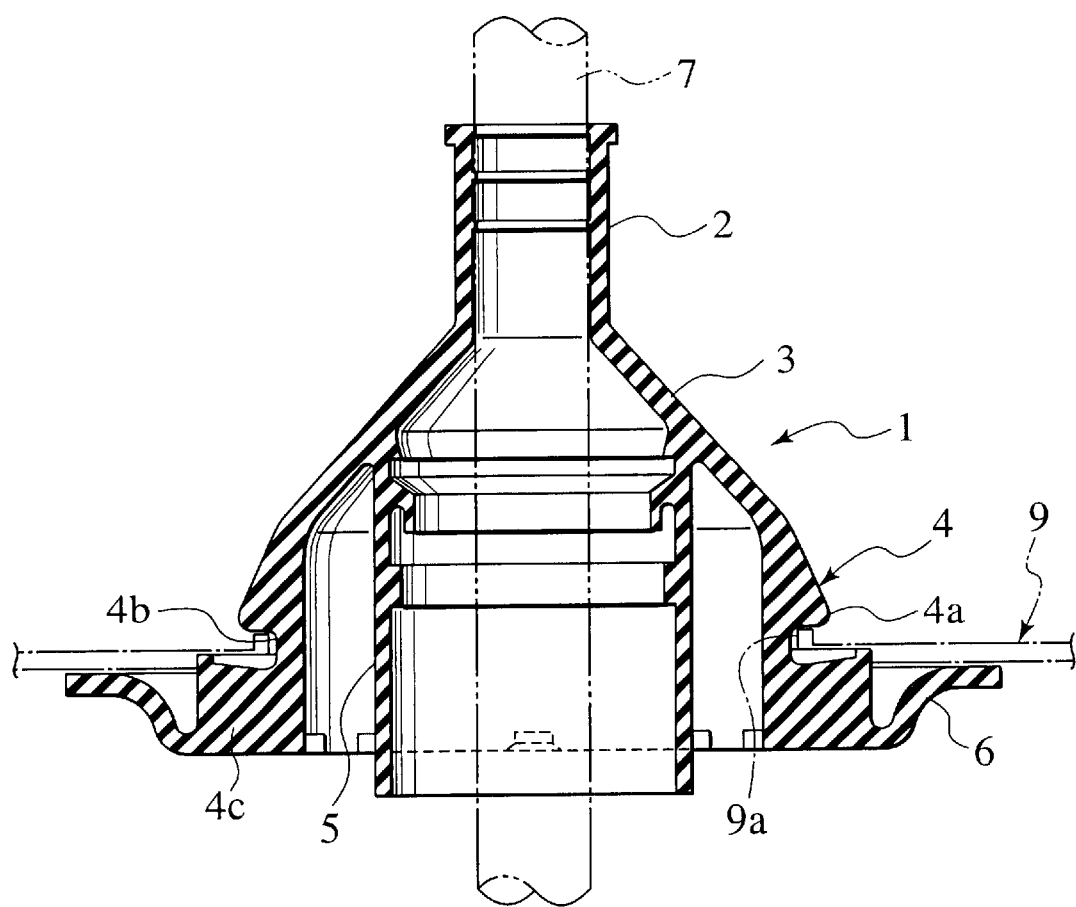
FIG. 1 is a sectional view of a conventional grommet.
Figure 2:
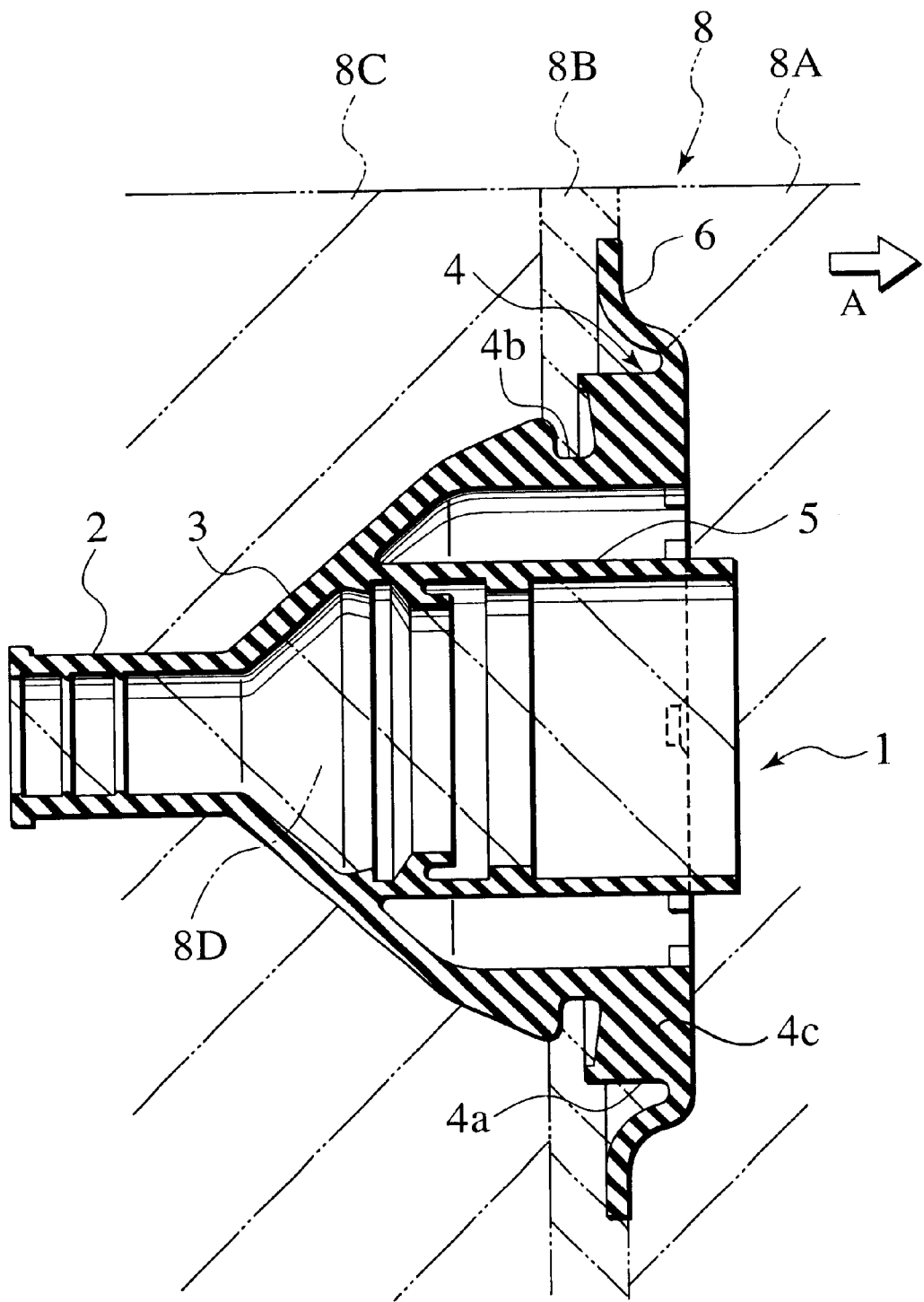
FIG. 2 is a sectional view showing a relationship between the conventional grommet and a molding die.
Figure 3:
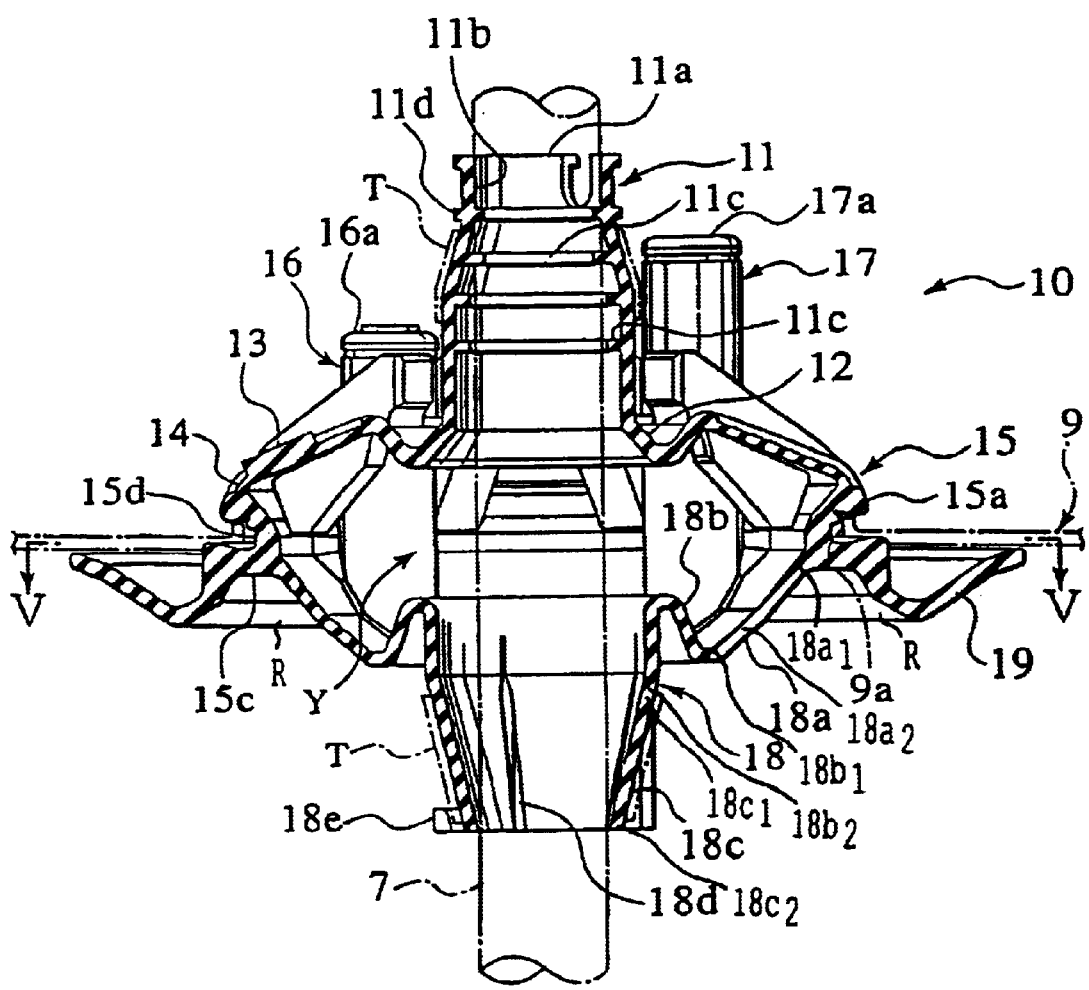
FIG. 3 is a sectional view of a grommet according to one embodiment of the present invention.
Figure 6:
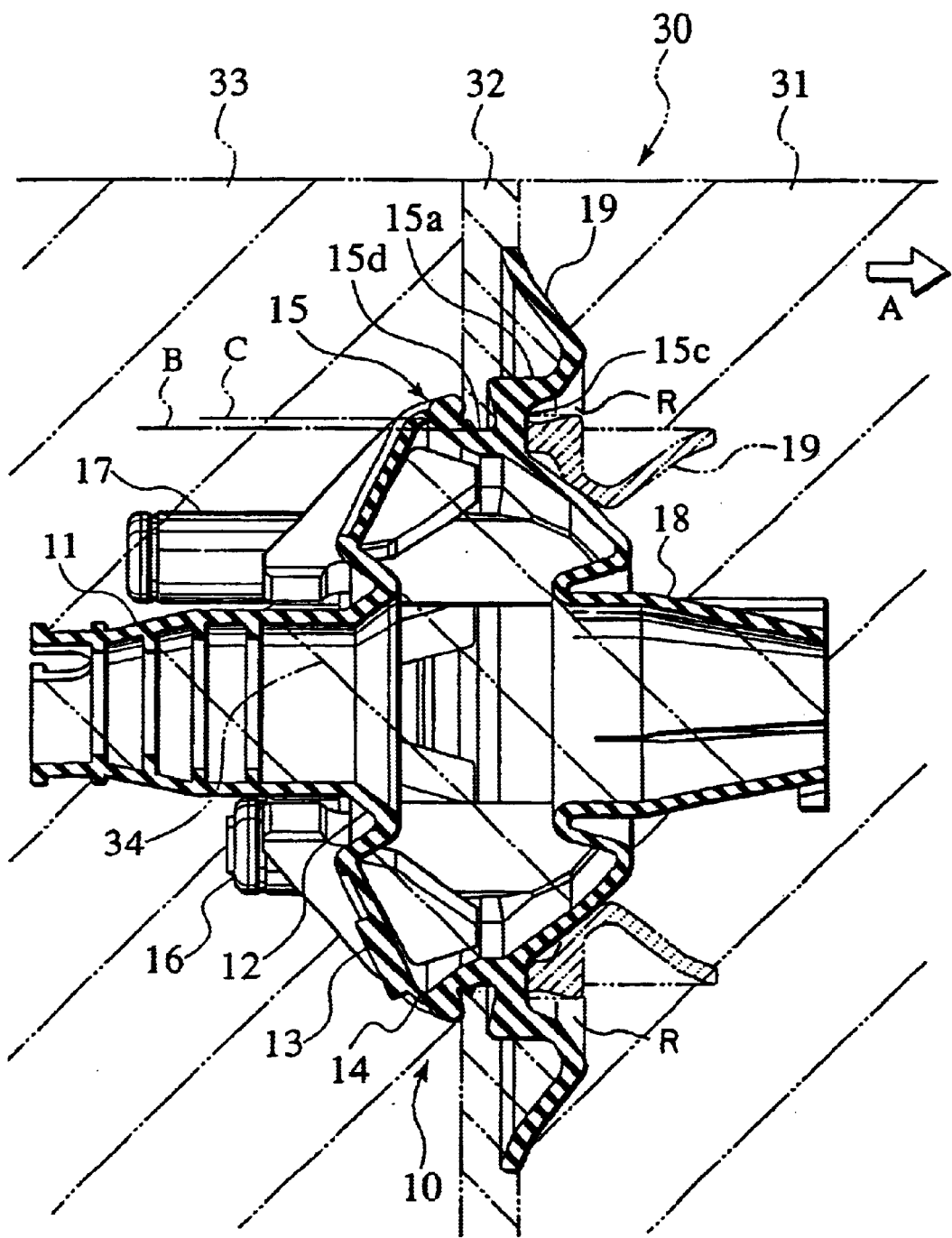
FIG. 6 is a sectional view showing a relationship between the grommet according to an embodiment of the present invention and a molding die.

As shown in FIG. 3 and FIG. 6, the grommet 10 has a small diameter drum portion 11, a inclined portion 13, a large diameter drum portion 15, preliminary through drum portions 16 and 17, a soundproof film 18 and a lip portion 19. The thin small diameter drum portion 11 has a cylindrical shape, and a wire harness 7 is inserted therethrough. The inclined portion 13 is formed integrally with the small diameter drum portion 11 via a connecting portion 12 which is folded into a V-shape, and it is formed thin and in an approximately cylindrical shape. The large diameter drum portion 15 is formed integrally with the inclined portion 13 via a connecting portion 14, and it is formed thick and in an approximately cylindrical shape. The preliminary through drum portions 16 and 17 are integrally formed to protrude from the inclined portion 13 between the small diameter drum portion 11 and the large diameter drum portion 15, and they are plural optional through drum portions. The soundproof film 18 extends from an inner end of a thin-wall portion 15c on a rear surface of the large diameter drum portion 15 to a position where it closely contacts with the wire harness 7 so as to form a soundproof air layer Y therein. The lip portion 19 integrally protrudes from an outer wall surface 15a of the large diameter drum portion 15 so as to come closely into contact with a panel 9 for vehicle, mentioned later, and it has a V-shaped portion. The small diameter drum portion 11, the inclined portion 13 and the large diameter drum portion 15 are molded integrally by the molding die 30 utilizing an elastic material such as rubber.

As shown in FIGS. 3 and 6, the small diameter drum portion 11 is slanted from its center, and a side of an end opening 11a has a smaller diameter than that of a base end side. A plurality of expanded portions 11c with different inner diameters are formed into a circular shape so as to protrude from an inner wall 11b integrally. The wire harness 7 which penetrates through the small diameter drum portion 11 is tightened by the respective expanded portions 11c. Further, the wire harness 7 is held to the small diameter drum portion 11 by an adhesive tape T which is wound around an outer periphery of the small diameter drum portion 11 without a gap. A circular tape retaining portion 11d is formed integrally so as to protrude from the outer wall of the small diameter drum portion 11. A circular and concave fitting groove 15d which is fitted into a through hole 9a of the panel 9 is formed on the outer peripheral surface 15a of the large diameter drum portion 15. The large diameter drum portion 15 is formed with a thin-walled portion 15c on its rear surface so as to have a predetermined thickness. As shown in FIG. 6, when the molding die 30, which is composed of an upper die 31, a middle plate 32, a lower die 33, and a core 34, is released, the lip portion 19, with a large undercut amount or recess R, elastically deforms to a side of the thin-wall portion 15c (see the dashed line position of the lip portion 19 with the large undercut amount or recess R as shown towards the bottom of FIG. 6). As a result, the molding die 30 can be released easily. Thus, as can be clearly seen in FIG. 3, the thin-wall portion 15c is formed on a rear surface side of the large diameter drum portion 15. In addition, it is clear from FIG. 3, that the thin-wall portion 15c is formed below the fitting groove 15d and that the thin-wall portion 15c is made thin because of recess R extending upwardly from a bottom surface of the large diameter drum portion 15 toward the fitting groove 15d.

Figure 4:
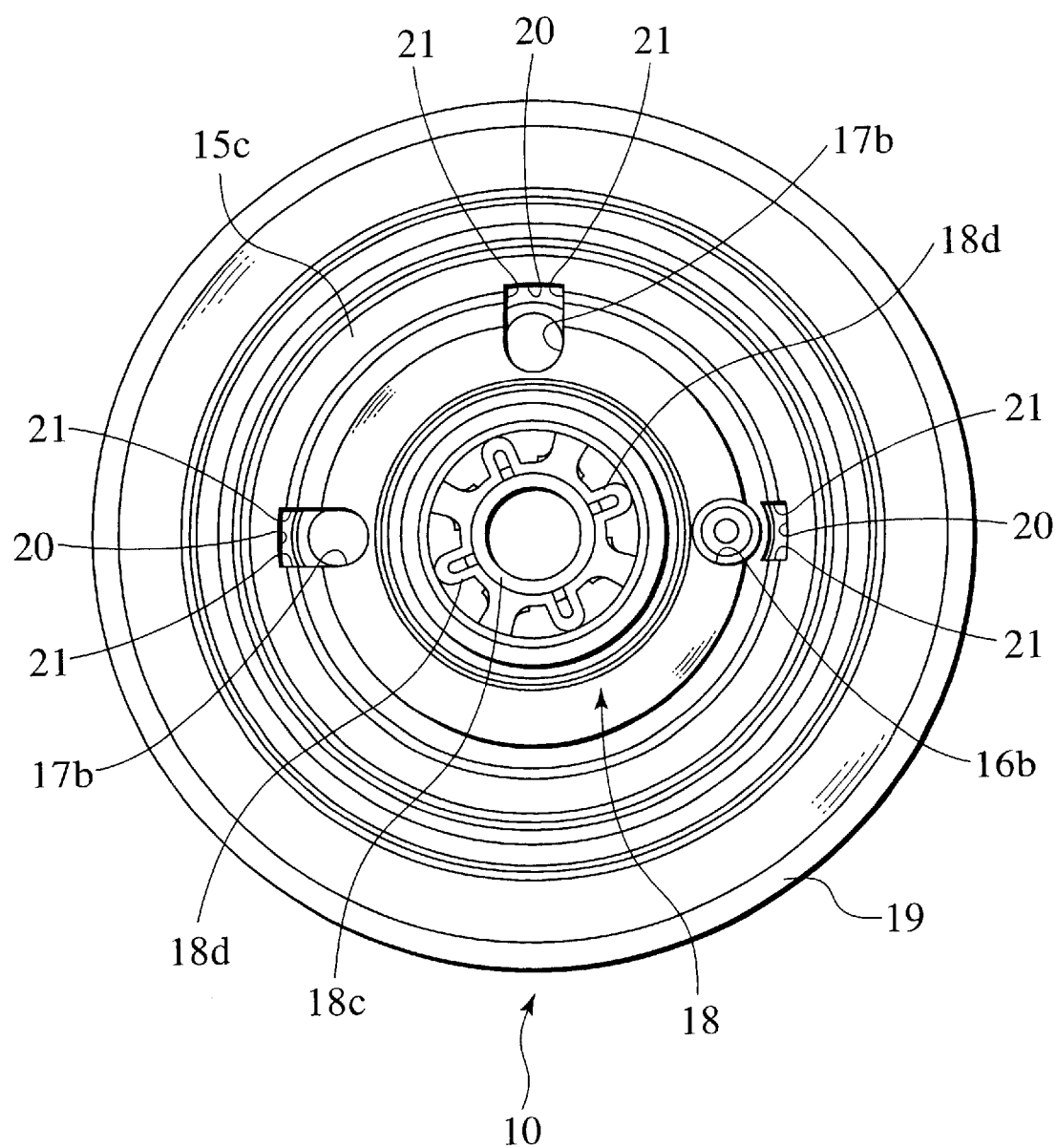
FIG. 4 is an explanatory diagram in which the grommet according to an embodiment of the present invention is viewed from a soundproof film side.
Figure 5:
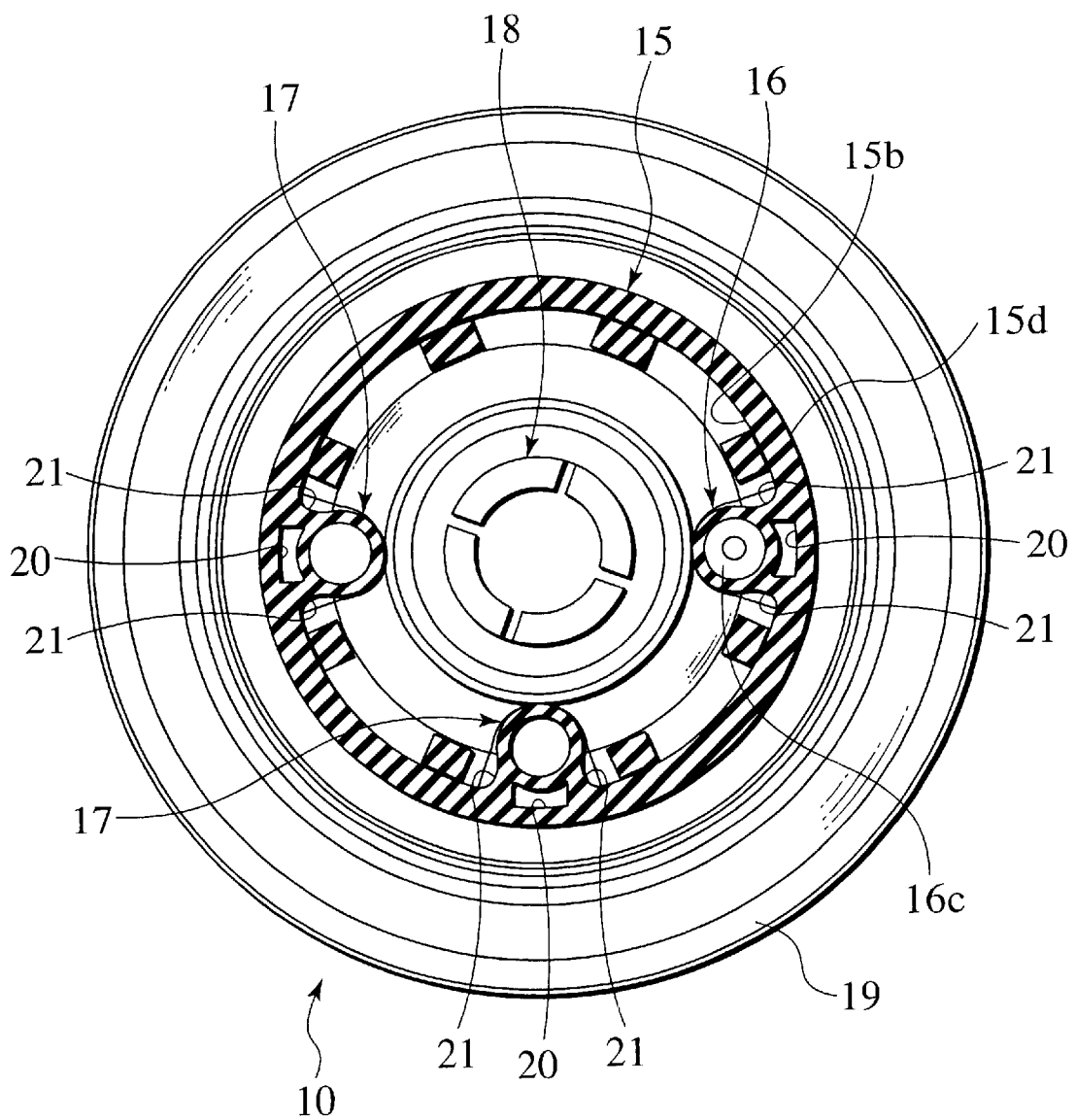
FIG. 5 is a sectional view along a line V—V in FIG. 3.

As shown in FIGS. 3 to 5, the optional preliminary through drum portions 16 and 17 are formed into a cylindrical shape. Further, the preliminary through drum portions 16 and 17 are provided on the inside of the large diameter drum portion 15 and the soundproof film 18, respectively. A hood lock cable, not shown, is inserted through the short preliminary through drum portion 16 so as to be held there. As shown in FIG. 3, an end of the short preliminary through drum portion 16 is blocked by a cover portion 16a. After the cover portion 16a at the end of the preliminary through drum portion 16 is cut so that a hole is formed at the time of optional attachment, the drum portion 16 is used. Washer hoses or fog lamp-use wires, not shown, are inserted through the long preliminary through portions 17, respectively, so as to be held. Moreover, ends of the preliminary through drum portions 17 are blocked by the cover portions 17a, respectively. After the cover portions 17a are cut so that holes are formed at the time of optional attachment, the drum portions 17 are used.

As shown in FIGS. 3 and 6, the soundproof film 18 has a curved portion 18a, a bent portion 18b, and an electric wire holding drum portion 18c. The curved portion 18a extends from an inner end (an end on the inner side) of the thin-wall portion 15c on the rear surface of the large diameter drum portion 15 to a side of the wire harness 7. In other words, the curved portion 18a has two ends which will be called a first or outer end $18a_1$, where it is connected to the inner end of the thin-wall portion 15c of the large diameter drum portion 15, and a second or inner end $18a_2$, where it is connected to the bent portion 18b. The bent portion 18b is folded back into a V-shape to the inside of the curved portion 18a. In other words, the bent portion 18b has two ends which will be called a third or outer end $18b_1$, where it is connected to the curved portion 18a, and a fourth or inner end $18b_2$, where it is connected to the electric wire holding drum portion 18c. The electric wire holding drum portion 18c extends from the bent portion 18b to a position where it comes closely into contact with the wire harness 7, and has an approximately cylindrical shape. In other words, the electric wire holding portion 18c has two ends which will be called a fifth or outer end $18c_1$, where it is connected to the bent portion 18b, and a sixth or inner end $18c_2$, where it contacts the wire harness 7 when the wire harness 7 is inserted through the grommet 10.

A plurality of shortened diameter portions 18d are formed along a longitudinal direction of the electric wire holding drum portion 18c. The shortened diameter portion 18d is formed integrally with the electric wire holding drum portion 18c so as to protrude to the outside, and have an approximately U-shaped portion. The wire harness 7, which is inserted through the electric wire holding drum portion 18c, is held in such a manner that the respective shortened diameter portions 18d are pushed by the adhesive tape T which is wound around the outer periphery of the electric wire holding drum portion 18c without leaving a gap. As a result, a space formed among the small diameter drum portion 11, the inclined portion 13, the large diameter drum portion 15, and the soundproof film 17 comprise a soundproof air layer Y. Here, a tape retaining portion 18e is formed integrally so at to protrude from the outer wall of the electric wire holding drum portion 18c.

As shown in FIGS. 4 and 5, soundproof walls 21 are integrally formed between the inner peripheral surface 15b of the large diameter drum portion 15 and the respective preliminary through drum portions 16 and 17, respectively. The preliminary through drum portions 16 and 17 are provided on the inside of the soundproof film 18 and their peripheries are covered with the soundproof film 18. More concretely, concave portions 20, which extend up to the soundproof film 18, are formed on the large diameter drum portion 15 in the vicinity of the preliminary through drum portions 16 and 17, respectively. A pair of the soundproof walls 21 are integrally formed on both sides of each concave portion 20 so as to protrude. Reference numerals 16b and 17b in FIG. 4 are base end openings of the preliminary through drum portions 16 and 17.

According to the grommet 10 of the embodiment, as shown in FIG. 6, an outermost position C of the core 34 of the molding die 30 is occasionally on a side closer to the outer wall surface 15a than the position B of the fitting groove 15d. At this time, just after the upper die 31 is moved in the direction of the arrow A at the time of the release of the molding die 30, it is necessary to move the middle plate 32 in the same direction. At this time, the rear surface side of the large diameter drum portion 15 is thinned to the pulling direction so that the lip portion 19 elastically deforms to the thin-wall portion 15c side so as to be easily inverted. In order that the lip portion 19 in an inverted state does not interfere with the soundproof film 18, the soundproof film 18 extends from an inner end of the thin-wall portion 15c on the rear surface of the large diameter drum portion 15 so as to incline to the wire harness 7 side.

In such a manner, since the rear surface of the large diameter drum portion 15 is thinned, when the grommet 10 is molded by the molding die 30, the lip portion 19 is elastically deformed to the thinned rear surface side of the large diameter drum portion 15 easily and securely. Therefore, the molding die 30 can be easily opened. As a result, mold release characteristics at the time of molding the grommet 10 can be improved greatly, so that the productivity of the grommet 10 can be further improved. When the lip portion 19 is inverted due to elastic deformation at the time of release, the prevention of interference between the lip portion 19 and the soundproof film 18 can be assured. Therefore, the easy release of the grommet 10 with excellent soundproof characteristics from the molding die 30 is assured.

In the grommet 10 molded in such a manner, as shown in FIG. 3, after the wire harness 7 is inserted through the cylindrical small diameter drum portion 11 and the cylindrical electric wire holding drum portion 18c of the soundproof film 18, the adhesive tape T is wound around the outer periphery of the small diameter drum portion 11 so that the wire harness 7 can be held in the small diameter drum portion 11 without a gap. Further, the adhesive tape T is wound around the outer periphery of the electric wire holding drum portion 18c so that the wire harness 7 is held in the electric wire holding drum portion 18c without a gap. As a result, the soundproof air layer Y is formed among the small diameter drum portion 11, the inclined portion 13, the large diameter drum portion 15 and the soundproof film 18.

At this time, the air layer Y, which is surrounded by the inner wall 11a, the inclined portion 13, the inner peripheral surface 15b and the soundproof film 18, can be obtained securely. As a result, the soundproof characteristics of the grommet 10 can be improved.

The above-mentioned embodiment showed the example of a grommet, which is attached to a panel for vehicle, but needless to say, the panel to which the grommet is attached is not limited to vehicle-use.

The entire content of a Japanese Patent Application No. P2001-217996 with a filing date of Jul. 18, 2001 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. In a grommet including a small diameter drum portion through which a wire harness is inserted, and a large diameter drum portion provided adjacently to the small diameter drum portion and through which the wire harness is inserted, and a fitting groove provided on an outer wall surface of the large diameter drum portion and fitted into a through hole of a panel, the improvement comprising:

a lip portion which is provided on an outer side from the outer wall surface of the large diameter portion and contacts with the panel;

a thin-wall portion formed on a rear surface side of the large diameter drum portion; and a soundproof film for forming an air layer on the inside of the large diameter drum portion, wherein the thin-wall portion is provided between the lip portion and the soundproof film, and wherein the soundproof film extends from an inner end of the thin-wall portion to a position where it contacts with the wire harness.

2. The grommet according to claim 1, wherein the lip portion is formed into an appropriate V-shape, and the thin-wall portion is provided between an outer wall of the lip portion and the soundproof film.

3. The grommet according to claim 1, wherein the small diameter drum portion is formed thin and the large diameter drum portion is formed thick.

4. The grommet according to claim 1, wherein the grommet is formed by an elastic material so that the small diameter drum portion, the large diameter drum portion, the fitting groove, and the lip portion are integral.

5. The grommet according to claim 1, wherein:

the soundproof film is comprised of a curved portion, an electric wire holding drum portion, and a bent portion disposed between the curved portion and the electric wire holding drum portion, the curved portion has a first end, which is an outer end of the curved portion and which is connected to the inner end of the thin-wall portion, and a second end, which is an inner end of the curved portion, the bent portion has a third end, which is an outer end of the bent portion and which is connected to the second end of the curved portion, and fourth end, which is an inner end of the bent portion, and the electric wire holding drum portion has a fifth end, which is one an outer end of the electric wire holding drum portion and which is connected to the fourth end of the bent portion, and a sixth end, which is an inner end of the electric wire holding drum portion and which contacts the wire harness when the wire harness is inserted through the grommet.

6. The grommet according to claim 5, further comprising a plurality of shortened diameter portions formed along a longitudinal direction of the electric wire holding drum portion, the shortened diameter portions being U-shaped and protruding toward an outside of the grommet from an outer wall of the electric wire holding drum portion.

7. A grommet comprising:

a small diameter drum portion through which a wire harness is inserted;

a large diameter drum portion provided adjacently to the small diameter drum portion and through which the wire harness is inserted;

a fitting groove provided on an outer wall surface of the large diameter drum portion and fitted into a through hole of a panel;

a lip portion which is provided on an outer side from the outer wall surface of the large diameter drum portion and contacts with the panel; and a thin-wall portion formed on a rear surface side of the large diameter drum portion below the fitting groove via a recess extending upwardly from a bottom surface of the large diameter drum portion toward the fitting groove.

8. The grommet according to claim 7, further comprising a soundproof film for forming an air layer on the inside of the large diameter drum portion, wherein the thin-wall portion is provided between the lip portion and the soundproof filn.

9. The grommet according to claim 8, wherein the soundproof film extends from an inner end of the thin-wall portion to a position where it contacts with the wire harness.

10. The grommet according to claim 9, wherein the lip portion is formed into an appropriate V-shape, and the thin-wall portion is provided between an outer wall of the lip portion and the soundproof film.

11. The grommet according to claim 10, wherein:

the soundproof film is comprised of a curved portion, an electric wire holding drum portion, and a bent portion disposed between the curved portion and the electric wire holding drum portion, the curved portion has a first end, which is an outer end of the curved portion and which is connected to the inner end of the thin-wall portion, and a second end, which is an inner end of the curved portion, the bent portion has a third end, which is an outer end of the bent portion and which is connected to the second end of the curved portion, and fourth end, which is an inner end of the bent portion, and the electric wire holding drum portion has a fifth end, which is an outer end of the electric wire holding drum portion and which is connected to the fourth end of the bent portion, and a sixth end, which is an inner end of the electric wire holding drum portion and which contacts the wire harness when the wire harness is inserted through the grommet.

12. The grommet according to claim 11, further comprising a plurality of shortened diameter portions formed along a longitudinal direction of the electric wire holding drum portion, the shortened diameter portions being U-shaped and protruding toward an outside of the grommet from an outer wall of the electric wire holding drum portion.

13. The grommet according to claim 7, wherein the small diameter drum portion is formed thin and the large diameter drum portion is formed thick.

14. The grommet according to claim 7, wherein the grommet is formed by an elastic material so that the small diameter drum portion, the large diameter drum portion, the fitting groove, and the lip portion are integral.

* * * * *